(12) United States Patent
Yamanaka et al.

(10) Patent No.: US 12,247,108 B2
(45) Date of Patent: Mar. 11, 2025

(54) STRETCHED FILM, PACKAGING MATERIAL, AND METHOD FOR PRODUCING STRETCHED FILM

(71) Applicant: Mitsubishi Gas Chemical Company, Inc., Tokyo (JP)

(72) Inventors: Masaki Yamanaka, Hiratsuka (JP); Takafumi Oda, Hiratsuka (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 958 days.

(21) Appl. No.: 17/050,338

(22) PCT Filed: Apr. 25, 2019

(86) PCT No.: PCT/JP2019/017591
§ 371 (c)(1),
(2) Date: Oct. 23, 2020

(87) PCT Pub. No.: WO2019/208687
PCT Pub. Date: Oct. 31, 2019

(65) Prior Publication Data
US 2021/0139213 A1    May 13, 2021

(30) Foreign Application Priority Data

Apr. 26, 2018   (JP) ................ 2018-084621

(51) Int. Cl.
| *C08J 5/18* | (2006.01) |
| --- | --- |
| *B29C 55/00* | (2006.01) |
| *B29C 55/02* | (2006.01) |
| *B32B 27/34* | (2006.01) |
| *C08L 77/06* | (2006.01) |
| *B29K 77/00* | (2006.01) |
| *B32B 27/32* | (2006.01) |
| *B32B 27/36* | (2006.01) |

(52) U.S. Cl.
CPC .............. *C08J 5/18* (2013.01); *B29C 55/005* (2013.01); *B29C 55/02* (2013.01); *C08L 77/06* (2013.01); *B29K 2077/00* (2013.01); *B32B 27/32* (2013.01); *B32B 27/34* (2013.01); *B32B 27/36* (2013.01); *B32B 2270/00* (2013.01); *B32B 2439/60* (2013.01); *B32B 2439/70* (2013.01); *C08L 2203/10* (2013.01); *C08L 2203/16* (2013.01); *C08L 2205/02* (2013.01)

(58) Field of Classification Search
CPC ... B29C 55/005; B29C 55/02; B29K 2077/00; B32B 27/34; B32B 27/32; B32B 27/36; B32B 2270/00; B32B 2439/60; B32B 2439/70; C08J 5/18; C08J 2377/02; C08J 2477/10; C08L 77/06; C08L 2203/10; C08L 2203/16; C08L 2205/02; C08L 77/02; B65D 65/02; B65D 2565/381; B65D 65/40; C08G 69/265
See application file for complete search history.

(56) References Cited

U.S. PATENT DOCUMENTS

| 5,352,402 | A | 10/1994 | Orimoto et al. |
| --- | --- | --- | --- |
| 8,124,204 | B2 | 2/2012 | Mitadera et al. |
| 2006/0029823 | A1 | 2/2006 | Brown |
| 2007/0154668 | A1 | 7/2007 | Rhee et al. |
| 2010/0304164 | A1* | 12/2010 | Sato ................ B29C 45/1684 525/66 |
| 2016/0083581 | A1* | 3/2016 | Ishii ................... B32B 27/36 206/524.2 |
| 2017/0342269 | A1 | 11/2017 | Kikuchi et al. |
| 2018/0201744 | A1 | 7/2018 | Otsuka et al. |
| 2018/0334539 | A1 | 11/2018 | Kato et al. |
| 2020/0079959 | A1 | 3/2020 | Sato et al. |

FOREIGN PATENT DOCUMENTS

| JP | S60-232952 A | 11/1985 |
| --- | --- | --- |
| JP | S60-238355 A | 11/1985 |
| JP | H03-103488 A | 4/1991 |
| JP | H03-205124 A | 9/1991 |
| JP | H07-223305 A | 8/1995 |
| JP | H08-059859 A | 3/1996 |

(Continued)

OTHER PUBLICATIONS

Machine translation of JP H08-59859 (Year: 1996).*
Machine translation of JP H08-199062. (Year: 1996).*
Extended European Search Report issued in corresponding European Application No. 19793892.1 on May 3, 2021 (8 pages).
International Preliminary Report on Patentability and Written Opinion for PCT/JP2019/017591, mailed Jul. 23, 2019, and English Translation submitted herewith (11 pages).

(Continued)

*Primary Examiner* — John D Freeman
(74) *Attorney, Agent, or Firm* — Fitch, Even, Tabin & Flannery LLP

(57) ABSTRACT

A stretched film, which has excellent impact resistance and oxygen barrier properties and which suppresses the number of pinholes after being bent, a packaging material using the same, and a method for producing the stretched film are provided. The stretched film contains from 80 to 5 parts by mass of a polyamide resin (B) relative to from 20 to 95 parts by mass of a polyamide resin (A), the polyamide resin (A) being an aliphatic polyamide resin, the polyamide resin (B) containing a constituent unit derived from a diamine and a constituent unit derived from a dicarboxylic acid, 70 mol % or more of the constituent unit derived from a diamine being derived from xylylenediamine, from 30 to 70 mol % of the constituent unit derived from a dicarboxylic acid being derived from an α,ω-linear aliphatic dicarboxylic acid having from 4 to 8 carbons, and from 70 to 30 mol % of the constituent unit derived from a dicarboxylic acid being derived from isophthalic acid provided that a total of the constituent units derived from a dicarboxylic acid is not more than 100 mol %.

15 Claims, No Drawings

(56) References Cited

FOREIGN PATENT DOCUMENTS

| | | |
|---|---|---|
| JP | H08-199062 A | 8/1996 |
| JP | 2007-039132 A | 2/2007 |
| JP | 2008-531827 A | 8/2008 |
| TW | 200732420 A | 9/2007 |
| TW | 201631035 A | 9/2016 |
| WO | 2006/094148 A1 | 9/2006 |
| WO | 2017/010390 A1 | 1/2017 |
| WO | 2017/090556 A1 | 6/2017 |
| WO | 2018/180401 A1 | 10/2018 |

OTHER PUBLICATIONS

International Search Report for PCT/JP2019/017591, mailed Jul. 23, 2019, and English Translation submitted herewith (5 pages).
TIPO; Application No. 108114396; Office Action dated Nov. 29, 2022, 6 pages.
JPO; Application No. 2020-515556; Office Action dated May 2, 2023, 8 pages.

\* cited by examiner

STRETCHED FILM, PACKAGING MATERIAL, AND METHOD FOR PRODUCING STRETCHED FILM

CROSS-REFERENCE TO RELATED APPLICATIONS

This application is a U.S. national phase application filed under 35 U.S.C. § 371 of International Application Number PCT/JP2019/017591, filed Apr. 25, 2019, designating the United States, which claims priority from Japanese Application Number 2018-084621, filed Apr. 26, 2018.

FIELD OF THE INVENTION

The present invention relates to a stretched film, a packaging material, and a method for producing a stretched film.

BACKGROUND OF THE INVENTION

In the related art, a polyamide resin synthesized from m-xylylenediamine, adipic acid, and isophthalic acid has been known (Patent Documents 1 to 3). Furthermore, Patent Document 1 describes that a sheet obtained by blending such a polyamide resin into a polyethylene terephthalate resin has a small carbonic acid gas transmission coefficient. Furthermore, Patent Documents 2 and 3 describe such a polyamide resin has excellent oxygen barrier properties.

CITATION LIST

Patent Documents

Patent Document 1: JP 60-238355 A
Patent Document 2: JP 03-103488 A
Patent Document 3: WO 2017/090556

SUMMARY OF INVENTION

As described above, a polyamide resin synthesized from m-xylylenediamine, adipic acid, and isophthalic acid is a resin having excellent gas barrier properties; however, as technologies advance in recent years, suppression of the number of pinholes after bending has been demanded. Furthermore, excellent modulus of tensile elasticity, mechanical strength such as tensile strength and impact resistance, and oxygen barrier properties are also demanded.

An object of the present invention is to provide a novel material that satisfies the performances required in recent years, and more specifically relates to a stretched film, which has excellent mechanical strength and oxygen barrier properties and which suppresses the number of pinholes after being bent, a packaging material using the same, and a method for producing the stretched film.

Solution to Problem

As a result of a diligent examination conducted by the present inventors on the basis of the above-mentioned problems, the present inventors solved the above-mentioned problems by the following means <1>, and preferably by the following means <2> to <8>.

<1> A stretched film containing from 80 to 5 parts by mass of a polyamide resin (B) relative to from 20 to 95 parts by mass of a polyamide resin (A),
the polyamide resin (A) being an aliphatic polyamide resin,
the polyamide resin (B) containing a constituent unit derived from a diamine and a constituent unit derived from a dicarboxylic acid, 70 mol % or more of the constituent unit derived from a diamine being derived from xylylenediamine, from 30 to 70 mol % of the constituent unit derived from a dicarboxylic acid being derived from an α,ω-linear aliphatic dicarboxylic acid having from 4 to 8 carbons, and from 70 to 30 mol % of the constituent unit derived from a dicarboxylic acid being derived from isophthalic acid, provided that a total of the constituent units derived from a dicarboxylic acid is not more than 100 mol %.

<2> The stretched film according to <1>, where the α,ω-linear aliphatic dicarboxylic acid having from 4 to 8 carbons contains adipic acid.

<3> The stretched film according to <1> or <2>, where the xylylenediamine contains m-xylylenediamine.

<4> The stretched film according to any one of <1> to <3>, where the polyamide resin (A) contains at least one selected from the group consisting of polyamide 6, polyamide 66, and polyamide 6,66.

<5> The stretched film according to any one of <1> to <4>, where, relative to from 60 to 90 parts by mass of the polyamide resin (A), from 40 to 10 parts by mass of the polyamide resin (B) is contained.

<6> The stretched film according to any one of <1> to <5>, where 80 mass % or more of the stretched film contains of the polyamide resin (A) and the polyamide resin (B).

<7> A packaging material comprising the stretched film described in any one of <1> to <6>.

<8> A method for producing a stretched film, the method comprising stretching of a resin composition containing from 80 to 5 parts by mass of a polyamide resin (B) relative to from 20 to 95 parts by mass of a polyamide resin (A),
the polyamide resin (A) being an aliphatic polyamide resin,
the polyamide resin (B) containing a constituent unit derived from a diamine and a constituent unit derived from a dicarboxylic acid, 70 mol % or more of the constituent unit derived from a diamine being derived from xylylenediamine, from 30 to 70 mol % of the constituent unit derived from a dicarboxylic acid being derived from an α,ω-linear aliphatic dicarboxylic acid having from 4 to 8 carbons, and from 70 to 30 mol % of the constituent unit derived from a dicarboxylic acid being derived from isophthalic acid, provided that a total of the constituent units derived from a dicarboxylic acid is not more than 100 mol %.

According to the present invention, a stretched film, which has excellent mechanical strength and oxygen barrier properties and which suppresses the number of pinholes after being bent, a packaging material using the same, and a method for producing the stretched film can be provided.

DESCRIPTION OF EMBODIMENTS

The contents of the present invention will be described in detail below. Note that, in the present specification, "from . . . to . . . " is used to mean that the given numerical values are included as the lower limit value and the upper limit value, respectively.

The stretched film of the present invention contains from 80 to 5 parts by mass of a polyamide resin (B) relative to from 20 to 95 parts by mass of a polyamide resin (A), the polyamide resin (A) being an aliphatic polyamide resin, the polyamide resin (B) containing a constituent unit derived from a diamine and a constituent unit derived from a dicarboxylic acid, 70 mol % or more of the constituent unit derived from a diamine being derived from xylylenediamine, from 30 to 70 mol % of the constituent unit derived from a dicarboxylic acid being derived from an α,ω-linear aliphatic dicarboxylic acid having from 4 to 8 carbons, and from 70 to 30 mol % of the constituent unit derived from a dicarboxylic acid being derived from isophthalic acid, provided that a total of the constituent units derived from a dicarboxylic acid is not more than 100 mol %. By such a configuration, a stretched film, which has excellent modulus of tensile elasticity, mechanical strength such as tensile strength and impact resistance, and oxygen barrier properties and which suppresses the number of pinholes after being bent, is obtained.

The polyamide resin (B) is expected to achieve a high rigidity; however, because of this, it is predicted that the number of pinholes after bending increases. Furthermore, it is also predicted that the impact resistance deteriorates. Therefore, blending of the aliphatic polyamide resin (A) is considered. However, when the aliphatic polyamide resin (A) is blended in the polyamide resin (B), it is predicted that the oxygen barrier properties and the modulus of tensile elasticity decrease. In the present invention, a stretched film, which has excellent modulus of tensile elasticity, tensile strength, and impact resistance, as well as excellent oxygen barrier properties and which suppresses the number of pinholes after being bent, is successfully provided by selecting a film containing a resin composition in which, the aliphatic polyamide resin (A) and the polyamide resin (B) are blended in an appropriate ratio, and stretching the film. In particular, the stretched film of the present invention maintains all of the modulus of tensile elasticity, tensile strength, and impact resistance in a high level, and is a stretched film having a high rigidity.

Polyamide Resin (A)

The polyamide resin (A) used in the present invention is an aliphatic polyamide resin. Examples of the aliphatic polyamide resin include polyamide 6, polyamide 66, polyamide 10, polyamide 11, polyamide 12, polyamide 46, polyamide 610, polyamide 612, and polyamide 6,66. Polyamide 6, polyamide 66, and polyamide 6,66 are preferred, polyamide 6 and polyamide 6,66 are more preferred, and polyamide 6 is even more preferred.

Note that polyamide 6 is a polyamide resin having a constituent unit derived from caprolactam as a main component, but may contain another constituent unit as long as there is no deviation from the spirit of the present invention. Specific examples include constituent units derived from xylylenediamine described below for the polyamide resin (B), diamine other than xylylenediamine, isophthalic acid, α,ω-linear aliphatic dicarboxylic acid having from 4 to 8 carbons, and a dicarboxylic acid other than these, and constituent units derived from lactam other than caprolactam. Such other constituent units are in an amount of 10 mass % or less, and preferably 5 mass % or less, of the constituent unit derived from caprolactam. The same applies to other aliphatic polyamide resins.

The number average molecular weight of the polyamide resin (A) in the present invention is preferably from 5000 to 100000. Furthermore, the weight average molecular weight of the polyamide resin (A) is preferably from 80000 to 200000.

For the molecular weight (number average molecular weight and weight average molecular weight) of the present invention, the description of paragraph 0044 of WO 2017/033746 pamphlet can be taken into consideration, and the contents thereof are incorporated in the present specification.

Polyamide Resin (B)

The polyamide resin (B) contains a constituent unit derived from a diamine and a constituent unit derived from a dicarboxylic acid, 70 mol % or more of the constituent unit derived from a diamine is derived from xylylenediamine, from 30 to 70 mol % of the constituent unit derived from a dicarboxylic acid is derived from an α,ω-linear aliphatic dicarboxylic acid having from 4 to 8 carbons, and from 70 to 30 mol % of the constituent unit derived from a dicarboxylic acid is derived from isophthalic acid, provided that the total of the constituent units derived from a dicarboxylic acid is not more than 100 mol %. By blending such a polyamide resin, transparency and oxygen barrier properties of the stretched film can be further enhanced. The polyamide resin (B) used in the present invention is typically an amorphous resin. By using an amorphous resin, transparency of the stretched film can be further enhanced. The amorphous resin refers to a resin having a crystalline melting enthalpy $\Delta Hm$ of 5 J/g or less.

In the polyamide resin (B), 70 mol % or more, preferably 80 mol % or more, more preferably 90 mol % or more, even more preferably 95 mol % or more, yet even more preferably 99 mol % or more, of the constituent unit derived from a diamine is derived from xylylenediamine. The xylylenediamine preferably contains m-xylylenediamine and p-xylylenediamine, and more preferably contains m-xylylenediamine. In an embodiment of the present invention, preferably 90 mol % or more, more preferably 95 mol % or more, and even more preferably 99 mol % or more, of the xylylenediamine is m-xylylenediamine.

Examples of the diamine other than xylylenediamine include aromatic diamines, such as p-phenylenediamine; and aliphatic diamines, such as 1,3-bis(aminomethyl)cyclohexane, 1,4-bis(aminomethyl)cyclohexane, tetramethylene diamine, pentamethylene diamine, hexamethylene diamine, octamethylene diamine, and nonamethylene diamine. One type of these other diamines or two or more types of these other diamines may be used.

In the case where a diamine other than xylylenediamine is used as the diamine component, the proportion thereof is 30 mol % or less, more preferably from 1 to 25 mol %, and particularly preferably from 5 to 20 mol %, of the constituent unit derived from a diamine.

Among all the dicarboxylic acids constituting the constituent unit derived from a dicarboxylic acid in the polyamide resin (B), the lower limit of the proportion of the isophthalic acid is preferably 33 mol % or more, more preferably 35 mol % or more, even more preferably 38 mol % or more, and yet even more preferably 40 mol % or more, and may be 41 mol % or more. The upper limit of the proportion of the isophthalic acid is preferably 67 mol % or less, more preferably 65 mol % or less, even more preferably 62 mol % or less, and yet even more preferably 60 mol % or less. By setting to such a range, haze of the stretched film tends to be further decreased, which is preferable.

Among all the dicarboxylic acids constituting the constituent unit derived from a dicarboxylic acid in the polyamide resin (B), the lower limit of the proportion of the α,ω-linear aliphatic dicarboxylic acid having from 4 to 8 carbons is preferably 33 mol % or more, more preferably 35 mol % or more, even more preferably 38 mol % or more, and yet even more preferably 40 mol % or more. The upper limit of the proportion of the α,ω-linear aliphatic dicarboxylic acid having from 4 to 8 carbons is preferably 67 mol % or less, more preferably 65 mol % or less, even more preferably 62 mol % or less, and yet even more preferably 60 mol % or less, and may be 59 mol % or less. By setting to such a range, oxygen barrier properties of the stretched film tend to be further enhanced.

Examples of the α,ω-linear aliphatic dicarboxylic acid having from 4 to 8 carbons include aliphatic dicarboxylic acids, such as succinic acid, glutaric acid, pimelic acid, suberic acid, and adipic acid. One type thereof can be used, or two or more types thereof can be mixed and used; however, from the perspective of setting the melting point of the polyamide resin to appropriate range for molding processing, adipic acid is preferred among these.

Among all the dicarboxylic acids constituting the constituent unit derived from a dicarboxylic acid in the polyamide resin (B), the total proportion of the isophthalic acid and the α,ω-linear aliphatic dicarboxylic acid having from 4 to 8 carbons is preferably 90 mol % or more, more preferably 95 mol % or more, and even more preferably 98 mol % or more, and may be 100 mol %. By setting to such a proportion, transparency of the stretched film tends to be further enhanced.

Examples of other dicarboxylic acid, other than isophthalic acid and the α,f-linear aliphatic dicarboxylic acid having from 4 to 8 carbons, include phthalic acid compounds, such as terephthalic acid, and orthophthalic acid; and naphthalene dicarboxylic acid, such as 1,2-naphthalene dicarboxylic acid, 1,3-naphthalene dicarboxylic acid, 1,4-naphthalene dicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,6-naphthalene dicarboxylic acid, and 2,7-naphthalene dicarboxylic acid. One type thereof can be used, or two or more types thereof can be mixed and used.

The polyamide resin (B) preferably is substantially free of constituent unit derived from terephthalic acid. "Substantially free" refers to 5 mol % or less, preferably 3 mol % or less, and even more preferably 1 mol % or less, of the molar amount of isophthalic acid contained in the polyamide resin (B). With such a configuration, appropriate molding processability is maintained, and the gas barrier properties are less likely to be changed even in high humidity.

Note that the polyamide resin (B) used in the present invention contains the constituent unit derived from a dicarboxylic acid and the constituent unit derived from a diamine, but may also include a constituent unit besides the constituent unit derived from a dicarboxylic acid and the constituent unit derived from a diamine, or other moieties such as terminal groups. Examples of other constituent units include, but are not limited to, constituent units derived from lactams, such as s-caprolactam, valerolactam, laurolactam, and undecalactam, and aminocarboxylic acids, such as 11-aminoundecanoic acid and 12-aminododecanoic acid, and the like. Furthermore, the polyamide resin (B) used in the present invention may contain trace amounts of components, such as additives used for synthesis. In the polyamide resin (B) used in the present invention, typically 95 mass % or more, and preferably 98 mass % or more, is the constituent unit derived from a dicarboxylic acid or the constituent unit derived from a diamine.

The number average molecular weight (Mn) of the polyamide resin (B) is preferably 8000 or more, and more preferably 10000 or more. The upper limit of the number average molecular weight of the polyamide resin (B) is not particularly specified and, for example, may be 50000 or less, 30000 or less, or 20000 or less.

The glass transition temperature of the polyamide resin (B) is preferably higher than 90° C. and 150° C. or lower, more preferably from 95 to 145° C., even more preferably 101 to 140° C., and yet even more preferably from 120 to 135° C.

For the production of the polyamide resin (B) used in the present invention, the descriptions of WO 2017/090556 pamphlet and WO 2012/140785 pamphlet can be taken into consideration, and the contents thereof are incorporated in the present specification.

Blend Ratio of the Polyamide Resin (A) and the Polyamide Resin (B)

From the perspective of oxygen barrier properties and tensile characteristics, the stretched film contains from 80 to 5 parts by mass of the polyamide resin (B) relative to from 20 to 95 parts by mass of the polyamide resin (A), preferably contains from 70 to 5 parts by mass of the polyamide resin (B) relative to from 30 to 95 parts by mass of the polyamide resin (A), more preferably contains from 60 to 5 parts by mass of the polyamide resin (B) relative to from 40 to 95 parts by mass of the polyamide resin (A), even more preferably contains from 50 to 5 parts by mass of the polyamide resin (B) relative to from 50 to 95 parts by mass of the polyamide resin (A), yet even more preferably contains from 45 to 5 parts by mass of the polyamide resin (B) relative to from 55 to 95 parts by mass of the polyamide resin (A), yet even more preferably contains from 40 to 5 parts by mass of the polyamide resin (B) relative to from 60 to 95 parts by mass of the polyamide resin (A), and yet even more preferably contains from 40 to 10 parts by mass of the polyamide resin (B) relative to from 60 to 90 parts by mass of the polyamide resin (A).

For the polyamide resin (A) and the polyamide resin (B) in the present invention, one type each may be used, or two or more types each may be used. When two or more types are used, the total amount is preferably within the range described above.

The resin composition used in the present invention may contain another polyamide resin besides the polyamide resin (A) and the polyamide resin (B) and may contain no other polyamide resin. Specific examples of such another polyamide resin include polyamide 11, polyamide 12, poly(m-xylylene sebacamide)(MXD10), poly(m-, p-xylylene sebacamide)(MPXD10), and poly(p-xylylene sebacamide) (PXD10). One type each of these other polyamide resins, or two or more types thereof may be used.

The resin composition used in the present invention is preferably substantially free of another polyamide resin besides the polyamide resin (A) and the polyamide resin (B). "Substantially free" refers to a condition in which the proportion of the other polyamide resin other than the polyamide resin (A) and the polyamide resin (B) among the polyamide resins is 3 mass % or less, and preferably 1 mass % or less.

The resin composition used in the present invention may contain another component other than the polyamide resins described above. Examples of such a component other than the polyamide resins described above include fillers, matting agents, heat resistant stabilizers, weather resistant stabilizers, ultraviolet absorbents, plasticizers, flame retardants, antistatic agents, anti-coloration agents, anti-gelling agents, impact modifiers, lubricants, colorants, and conductive additives. One type each of these additives, or two or more types thereof may be used.

The resin composition used in the present invention is preferably substantially free of silicate. By employing a configuration which is substantially free of silicate, transparency can be further enhanced. "Substantially free of silicate" means that the content of the silicate is less than 0.01 mass % of the resin composition.

In the present invention, 80 mass % or more of the stretched film preferably contains the polyamide resin (A) and the polyamide resin (B), 90 mass % or more of the stretched film more preferably contains the polyamide resin (A) and the polyamide resin (B), 95 mass % or more of the stretched film contains even more preferably the polyamide resin (A) and the polyamide resin (B), and 99 mass % or more of the stretched film yet even more preferably contains the polyamide resin (A) and the polyamide resin (B).

Stretching

The film of the present invention is stretched. Stretching can be confirmed by the fact that tensile strength and oxygen transmission rate (OTR) are enhanced or by the fact that the refractive index is different, as compared to those of a film that contains the same material and has the same thickness but is not stretched.

Hereinafter, an example of the method for producing the stretched film of the present invention is described; however, the present invention is not limited by these.

The method producing the stretched film of the present invention includes stretching a resin composition containing from 80 to 5 parts by mass of a polyamide resin (B) relative to from 20 to 95 parts by mass of a polyamide resin (A), the polyamide resin (A) being an aliphatic polyamide resin, the polyamide resin (B) containing a constituent unit derived from a diamine and a constituent unit derived from a dicarboxylic acid, 70 mol % or more of the constituent unit derived from a diamine being derived from xylylenediamine, from 30 to 70 mol % of the constituent unit derived from a dicarboxylic acid being derived from an α,ω-linear aliphatic dicarboxylic acid having from 4 to 8 carbons, and from 70 to 30 mol % of the constituent unit derived from a dicarboxylic acid being derived from isophthalic acid, provided that a total of the constituent units derived from a dicarboxylic acid is not more than 100 mol %.

In the method for producing the stretched film of an embodiment of the present invention, first, the resin composition is extruded on a casting roll from a T die in a melt-kneaded state. The extrusion temperature during the extrusion is not particularly specified as long as the resin composition is melted. The thickness of the polyamide resin film contains the melt-extruded resin composition is, for example, preferably a thickness that is 2 to 60 times, more preferably from 4 to 40 times, even more preferably from 6 to 30 times, and particularly preferably from 9 to 28 times, of the stretched film after the stretching although the thickness also depends on use and stretching ratio.

The stretching may be performed only in one direction (uniaxial stretching) or may be performed in two directions that are orthogonal to each other (biaxial stretching), and the biaxial stretching is preferred. Stretching in one direction of a machine direction (also referred to as "MD") of the polyamide resin film or a transverse direction (also referred to as "TD") of the polyamide resin film (more preferably MD), or stretching in two directions, both MD and TD, are preferred. In the case of biaxial stretching, the stretching in two directions may be performed at the same time or sequentially.

The MD stretching can be performed by passing the polyamide resin film through rolls having different peripheral speeds. In this case, the roll for which the polyamide resin film passes later is set to have a higher peripheral speed. Furthermore, a tenter can be also used for the stretching. Meanwhile, the TD stretching can be performed by using a tenter. A batch-type biaxial stretching machine may also be used.

The stretching ratio (MD or TD stretching ratio) in the case of uniaxial stretching of the polyamide resin film is preferably 2-fold or more, more preferably 3-fold or more, and even more preferably 5-fold or more.

The stretching ratio in each direction in the case of biaxial stretching of the polyamide resin film is preferably 2-fold or more, more preferably 2.5-fold or more, and even more preferably 2.9-fold or more. In the case where uniaxial or biaxial stretching is performed, the upper limit of each stretching ratio is not particularly specified and, for example, can be 5-fold or less, 4-fold or less, or 3.5-fold or less.

The total stretching ratio in the present invention is preferably 4-fold or more, more preferably 6-fold or more, and even more preferably 8-fold or more. The upper limit of the total stretching ratio is not particularly specified and, for example, can be 25-fold or less, 16-fold or less, or 13-fold or less. Note that total stretching ratio refers to a proportion of the area of the film after stretching relative to the area of the film before stretching, and is a value expressed by the following equation.

Total stretching ratio=MD stretching ratio×TD stretching ratio

The stretching may be performed at room temperature but is preferably performed under heating conditions. In the stretching under heating conditions, the stretching is performed preferably while the polyamide resin film is passed through a heated zone, or while the polyamide resin film is heated in a predetermined temperature atmosphere in a batch-type biaxial stretching machine. The stretching is each preferably performed at a temperature 20° C. lower than the melting point of the polyamide resin (A) to a temperature lower than the melting point, more preferably performed at a temperature 170° C. lower than the melting point of the polyamide resin (A) to a temperature 60° C. lower than the melting point, and even more preferably performed at a temperature 155° C. lower than the melting point of the polyamide resin (A) to a temperature 100° C. lower than the melting point.

Note that, in the case where two or more types of the polyamide resins (A) are contained, the temperature of the polyamide resins (A) during the stretching is preferably set based on the melting point of the polyamide resin (A) having the lowest melting point. Furthermore, in the case where the polyamide resin (A) has two or more melting points, the temperature is preferably set based on the lowest melting point.

Furthermore, in the case where the stretched film of the present invention is used as a laminate film containing the stretched film and another resin film, the stretching may be performed together with the other resin film at the same time.

In the method for producing the stretched film of the present invention, after the stretching, heat fixation and relaxation are preferably performed. The relaxation is preferably performed during the process of heat fixation. The heat fixation time is preferably from 5 seconds to 5 minutes, and more preferably from 10 seconds to 1 minute. In the case where the relaxation is performed during the process of heat fixation, for example, when the heat fixation time is 30 seconds, the relaxation can be started after 15 to 16 seconds after the start of the heat fixation.

The heat fixation is preferably performed at a temperature 70° C. lower than the melting point of the polyamide resin (A) to a temperature lower than the melting point, more preferably performed at a temperature 50° C. lower than the melting point of the polyamide resin (A) to a temperature 5° C. lower than the melting point, and even more preferably performed at a temperature 40° C. lower than the melting point of the polyamide resin (A) to a temperature 10° C. lower than the melting point.

The relaxation is preferably performed by, for example, returning the distance between chucks toward a direction opposite to the stretching direction.

In the case where the polyamide resin film is uniaxially stretched, the relaxation percentage is preferably from 0.5 to 10%, more preferably from 1 to 8%, and even more preferably from 1.5 to 6%, in the stretched direction.

In the case where the polyamide resin film is biaxially stretched, the relaxation percentage is preferably from 0.5 to 10%, more preferably from 1 to 8%, and even more preferably from 1.5 to 6%, in each stretched direction.

Note that the relaxation percentage is calculated as follows in the case of uniaxial stretching.

Relaxation percentage (%)=relaxation amount/stretched amount×100

Furthermore, the relaxation percentage is calculated as follows in the case of biaxial stretching.

MD relaxation percentage (%)=MD relaxation amount/MD stretched amount×100

TD relaxation percentage (%)=TD relaxation amount/TD stretched amount×100

The stretched film obtained after undergoing the process described above is typically wound in a roll or the like and stored. Furthermore, the stretched film is cut and used for various uses.

The final stretching ratio of the stretched film of the present invention is preferably obtained by adjusting the stretching amount and the relaxation amount in a manner that the final stretching ratio of the stretched film described above is achieved.

For the stretch molding by a T die and a tenter described above, the description of paragraphs 0049 to 0053 of WO 2017/010390 pamphlet can be taken into consideration, and the contents thereof are incorporated in the present specification.

Furthermore, for the stretched film of the present invention, the conditions and technologies described in paragraphs 0066 to 0080 of JP 2012-41527 A, paragraphs 0063 to 0079 of JP 2012-61851 A, and paragraphs 0088 to 0098 of JP 2012-107217 A can be applied as long as there is no deviation from the spirit of the present invention, and the contents thereof are incorporated in the present specification.

Physical Properties of Stretched Film

The oxygen transmission coefficient (OTC) of the stretched film of the present invention at 23° C. and a relative humidity of 60% is preferably 0.35 cc·mm/(m$^2$·day·atm) or less, and more preferably 0.30 cc·mm/(m$^2$·day·atm) or less. The lower limit is ideally 0 cc·mm/(m$^2$·day·atm); however, the lower limit of 0.10 cc·mm/(m$^2$·day·atm) or more can still adequately satisfy required performances. The oxygen transmission coefficient (OTC) is measured in accordance with the method described in the examples below.

The stretched film of the present invention can have a tensile strength of 130 MPa or more, 140 MPa or more, or 150 MPa or more, as measured in accordance with JIS K 7127. The upper limit is not particularly specified and, for example, the upper limit of 200 MPa or less can still adequately satisfy required performances. The tensile strength is measured in accordance with the method described in the examples below.

The stretched film of the present invention can have a modulus of tensile elasticity of 2.00 GPa or more, 2.50 GPa or more, or 2.70 GPa or more, as measured in accordance with JIS K 7127. The upper limit is not particularly specified and, for example, the upper limit of 3.50 GPa or less can still adequately satisfy required performances. For example, the modulus of tensile elasticity and thickness of a film for measurement are measured in accordance with the method described in the examples below.

The stretched film of the present invention can have a film impact value of more than 6.0 kg·cm, 6.5 kg·cm or more, or 7.0 kg·cm or more, as measured in accordance with ASTM D3420. The upper limit is not particularly specified and, for example, the upper limit of 15.0 kg·cm or less, or 10.0 kg·cm or less, can still adequately satisfy required performances. The film impact value is measured in accordance with the method described in the examples below.

Applications

The stretched film of the present invention can be used as a single-layer film. The thickness of the stretched film of the present invention can be appropriately selected depending on use and is not particularly limited; however, from the perspectives of, for example, strength, impact resistance, and barrier properties, the lower limit is preferably 10 μm or more, more preferably 15 μm or more, and even more preferably 20 μm or more. The upper limit is preferably 50 μm or less, more preferably 40 μm or less, and even more preferably 35 μm or less.

The present invention also describes a multilayer film having the stretched film of the present invention. Furthermore, the present invention describes a multilayer film having a polyester resin layer, the stretched film of the present invention, and a polyolefin resin film, in this order. The polyester resin is preferably a polyethylene terephthalate resin, and the polyolefin resin is more preferably a polypropylene resin and a polyethylene resin.

For these multilayer films, a dry lamination method, in which a polyester resin film, the stretched film of the present invention, and a polyolefin resin film are adhered to each other in this order by, for example, adhesive agents, and a production method, in which a composition containing the polyamide resin (A) and the polyamide resin (B) and a composition containing a polyolefin resin are coextruded, are exemplified.

For the multilayer film, descriptions in JP 2017-114532 A pamphlet and paragraphs 0120 to 0122 of JP 2016-169291 A pamphlet can be taken into consideration, and the contents thereof are incorporated in the present specification.

The present specification further describes a packaging material having the stretched film of the present invention or a multilayer film thereof. The packaging material of the present invention can be suitably used for, for example, wrap, pouches of various shapes, lid materials for containers, bottles, cups, trays, and tubes.

Each embodiment of the packaging materials and containers produced by using the stretched film of the present invention or the laminate film thereof has adequate oxygen barrier properties and a high rigidity. Furthermore, a container having excellent transparency can also be formed, and thus such a container can accommodate and store various articles in the case where visualization of the content is desired to enhance buyer's motivation.

Examples of an article to be stored in the container of the present invention include processed marine products, processed animal products, cooked rice, liquid food products, pharmaceuticals, reagents, and cosmetic materials. For these details, descriptions in paragraphs 0032 to 0035 of JP 2011-37199 A pamphlet can be taken into consideration, and the contents thereof are incorporated in the present specification.

EXAMPLES

The present invention is described in greater detail below through examples. The materials, usage amounts, proportions, processing details, processing procedures, and the like described in the examples below may be changed, as appropriate, as long as there is no deviation from the spirit of the present invention. Therefore, the scope of the present invention is not limited to the specific examples described below.

Polyamide Resin (A)

Polyamide 6 (PA6): UBE NYLON 1022B, available from Ube Industries, Ltd.; melting point: 225° C.
Polyamide 6,66 (PA6,66): Novamid 2030FC, available from DSM; melting point: 199° C.

Polyamide Resin (B)

Synthesis Example B

The polyamide resin B shown in Table 1 was synthesized according to the following method.

In a reaction vessel equipped with a stirrer, a partial condenser, a total condenser, a thermometer, a dropping funnel, a nitrogen introduction tube, and a strand die, 6000 g (41.06 mol) of precisely weighed adipic acid, 6821 g (41.06 mol) of isophthalic acid, hypophosphite (100 mass ppm in terms of phosphorus atom concentration in the polyamide resin), and 2.52 g of sodium acetate were charged. After the reaction vessel was adequately purged with nitrogen, nitrogen was filled to an internal pressure of 0.4 MPa, and the system was heated to 190° C. while being agitated under a small stream of nitrogen gas.

To the reaction vessel, 11184 g (82.11 mol) of m-xylylenediamine was added dropwise while the mixture was agitated, and the temperature of the system was continuously increased while formed condensation water was being removed out of the system. After dropwise addition of m-xylylenediamine was completed, the internal temperature was increased, and when the temperature reached 255° C., the pressure inside the reaction vessel was reduced. The internal temperature was then further increased, and the melt polycondensation reaction was continued for 10 minutes at 260° C. Next, the inside of the system was pressurized with nitrogen, and the obtained polymer was removed from the strand die and pelletized to obtain approximately 21 kg of polyamide resin pellets B.

It was found that the resin B had a crystal melting enthalpy $\Delta Hm$ of substantially 0 J/g in the process of increasing temperature and was an amorphous polyamide resin. The crystal melting enthalpy $\Delta Hm$ is a value obtained when the temperature was increased to 300° C. at a raising rate of temperature of 10° C./min in differential scanning calorimetry. Specifically, the description of paragraph 0036 of WO 2017/090556 pamphlet was followed.

Comparative Polyamide Resin

G21: Grilamid G21, available from EMS; amorphous polyamide resin obtained by polycondensation of 50 mol % of hexamethylene diamine, 33.3 mol % of isophthalic acid, and 16.7 mol % of terephthalic acid Example 1

Production Method of Stretched Film

The polyamide resin (A) and the polyamide resin (B) shown in Table 1 were dry-blended and then fed to a single screw extruder equipped with a T die (PTM-30, available from PLABOR Research Laboratory of Plastics Technology Co., Ltd.) and kneaded. The mixture was melt-extruded from the die at an extrusion temperature of 260° C. Specifically, the resin composition obtained by melt-kneading the components was extruded, and a film having a width of 175 mm and a thickness of 180 μm was obtained. The obtained film was cut into 135 mm square. Thereafter, by using a batch-type biaxial stretching machine (tenter method; EX10-S5, available from Toyo Seiki Seisaku-sho, Ltd.), while heating is performed in air atmosphere at 85° C., stretching was performed in MD and TD in a manner that the MD stretching ratio was 3-fold, the TD stretching ratio was 3-fold, and the total stretching ratio was 9-fold, and thus a stretched film having a thickness of 20 μm was obtained. During this stretching process, relaxation operation was performed in the middle of the process in a manner that the MD relaxation percentage was 3% and the TD relaxation percentage was 3%. The stretching temperature was 85° C. After the stretching, heat fixation was performed. The heat fixation temperature was 180° C., and the heat fixation time was 30 seconds.

Modulus of Tensile Elasticity and Tensile Strength

For the obtained stretched film, the modulus of tensile elasticity and the tensile strength were measured by using a strip having a width of 10 mm at a test rate of 50 mm/min in accordance with JIS K 7127. At the time of measurement, tensile test of the stretched film in MD was performed, and the distance between chucks was set to 50 mm. The tensile rate was set to 50 mm/min. The measurement environment was in an atmosphere at 23° C. and a relative humidity (RH) of 50%.

Number of Pinhole Count

The obtained stretched film was cut into 25 cm square and fixed to a pinhole resistance tester, and the film was bent for 1000 times by continuously subjecting the film to 440° twisting motion and 65 mm linear motion at a rate of 40 times/min. The number of pinholes of the film after bending was measured by using a pinhole inspection machine to calculate the number of pinholes per 100 $cm^2$ of the film. Note that the number of pinholes per 100 $cm^2$ of the film is calculated as described below.

Number of pinholes (number/100 $cm^2$)=total number of pinholes (number)/effective area tested ($cm^2$)×100

In the present examples, Gelbo Flex Tester, available from Rigaku Kogyo, was used as the pinhole resistance tester. Poroscope DC, available from Fischer, was used as the pinhole inspection machine.

The number of pinholes of 5/100 $cm^2$ or less is considered to be a practical level.

Film Impact Value

The obtained stretched film was cut into 10 cm square, and the film impact value was measured by using a film impact tester in accordance with ASTM D3420.

In the present examples, FT-60, available from Orientec Corporation was used as the film impact tester.

The film impact value of more than 6 kg·cm is considered to be a practical level.

Evaluation of Oxygen Barrier Properties

For the single-layer film obtained as described above, oxygen transmission rate (OTR) was measured in an atmosphere at 23° C. and a relative humidity (RH) of 60% by the isopiestic method, and the oxygen transmission coefficient (OTC) was calculated based on the measurement result. The pressure of the oxygen atmosphere was 1 atm, and the measurement time was 24 hours. Note that the oxygen transmission coefficient (OTC) is calculated as follows.

OTC=OTR×measurement film thickness (μm)/1000

The oxygen transmission rate (OTR) was measured by using an oxygen transmission rate measurement device (product name: "OX-TRAN (trade name, available from MOCON).

Stretchability

A: Stretching was performed without trouble.
B: Stretching was possible, but there were some cases where unevenness in thickness occurred even under the same stretching conditions.
C: Film was cut during stretching.

Examples 2 and 3 and Comparative Examples 1 to 3

Each stretched film was obtained in the same manner as in Example 1 except for changing the blended resin to those shown in Examples 2 and 3 and Comparative Examples 1 to 3 in Table 1. The measurement results of property values of each of the stretched films are shown together in Table 1 below.

TABLE 1

|  | Example 1 | Example 2 | Example 3 | Comparative Example 1 | Comparative Example 2 | Comparative Example 3 | Comparative Example 4 |
|---|---|---|---|---|---|---|---|
| Sample | PA6/B-1 70/30 | PA6/B-1 90/10 | PA6, 66/B-1 70/30 | PA6/G21 70/30 | PA6/G21 90/10 | PA6 | PA6, 66 |
| Tensile test Modulus of elasticity (GPa) | 3.06 | 2.81 | 2.05 | 2.77 | 2.49 | 2.01 | 1.31 |
| Strength (MPa) | 177 | 162 | 219 | 104 | 123 | 198 | 253 |
| Number of pinholes after bending for 1000 times (number/100 cm$^2$) | 3 | 2 | 3 | 2 | 1 | 1 | 1 |
| Film impact value (kg · cm) | 8 | 9 | 10 | 4 | 6 | 12 | 10 |
| Oxygen transmission coefficient (cc · mm/m$^2$ · atm · day) | 0.25 | 0.33 | 0.32 | 0.36 | 0.38 | 0.44 | 0.64 |
| Stretchability | A | A | A | A | A | C | B |

As is clear from the results shown above, by the configuration of the present invention, a stretched film, which had excellent modulus of tensile elasticity, tensile strength, and impact resistance, and oxygen barrier properties and which suppressed the number of pinholes after being bent, was obtained. In particular, the stretched film of the present invention has a high value from the perspective of maintaining high tensile strength and impact resistance while high modulus of tensile elasticity is maintained.

The invention claimed is:

1. A stretched film comprising a resin composition comprising from 80 to 5 parts by mass of a polyamide resin (B) relative to from 20 to 95 parts by mass of a polyamide resin (A),
the polyamide resin (A) being an aliphatic polyamide resin,
the polyamide resin (B) containing a constituent unit derived from a diamine and a constituent unit derived from a dicarboxylic acid, 70 mol % or more of the constituent unit derived from a diamine being derived from xylylenediamine, from 50 to 70 mol % of the constituent unit derived from a dicarboxylic acid being derived from an α,ω-linear aliphatic dicarboxylic acid having from 4 to 8 carbons, and from 50 to 30 mol % of the constituent unit derived from a dicarboxylic acid being derived from isophthalic acid, provided that a total of the constituent units derived from a dicarboxylic acid is not more than 100 mol %, the resin composition being substantially free from silicate,
wherein 80 mass % or more of the stretched film contains the polyamide resin (A) and the polyamide resin (B), and
wherein the stretched film has a modulus of tensile elasticity of 2.50 GPa or more, as measured in accordance with JIS K 7127.

2. The stretched film according to claim 1, wherein the α,ω-linear aliphatic dicarboxylic acid having from 4 to 8 carbons contains adipic acid.

3. The stretched film according to claim 1, wherein the xylylenediamine contains m-xylylenediamine.

4. The stretched film according to claim 1, wherein the polyamide resin (A) contains at least one selected from the group consisting of polyamide 6, polyamide 66, and polyamide 6,66.

5. The stretched film according to claim 1, wherein, relative to from 60 to 90 parts by mass of the polyamide resin (A), from 40 to 10 parts by mass of the polyamide resin (B) is contained.

6. A packaging material comprising the stretched film described in claim 1.

7. A method for producing a stretched film, the method comprising stretching of a resin composition containing from 80 to 5 parts by mass of a polyamide resin (B) relative to from 20 to 95 parts by mass of a polyamide resin (A),
the polyamide resin (A) being an aliphatic polyamide resin,
the polyamide resin (B) containing a constituent unit derived from a diamine and a constituent unit derived from a dicarboxylic acid, 70 mol % or more of the constituent unit derived from a diamine being derived from xylylenediamine, from 50 to 70 mol % of the constituent unit derived from a dicarboxylic acid being derived from an α,ω-linear aliphatic dicarboxylic acid having from 4 to 8 carbons, and from 50 to 30 mol % of the constituent unit derived from a dicarboxylic acid being derived from isophthalic acid, provided that a total of the constituent units derived from a dicarboxylic acid is not more than 100 mol %, the resin composition being substantially free from silicate, wherein 80 mass % or more of the stretched film contains the polyamide resin (A) and the polyamide resin (B), and wherein the stretched film has a modulus of tensile elasticity of 2.50 GPa or more, as measured in accordance with JIS K 7127.

8. The stretched film according to claim 2, wherein the xylylenediamine contains m-xylylenediamine.

9. The stretched film according to claim 2, wherein the polyamide resin (A) contains at least one selected from the group consisting of polyamide 6, polyamide 66, and polyamide 6,66.

10. The stretched film according to claim 2, wherein, relative to from 60 to 90 parts by mass of the polyamide resin (A), from 40 to 10 parts by mass of the polyamide resin (B) is contained.

11. The stretched film according to claim 3, wherein the polyamide resin (A) contains at least one selected from the group consisting of polyamide 6, polyamide 66, and polyamide 6,66.

12. The stretched film according to claim 3, wherein, relative to from 60 to 90 parts by mass of the polyamide resin (A), from 40 to 10 parts by mass of the polyamide resin (B) is contained.

13. The stretched film according to claim 4, wherein, relative to from 60 to 90 parts by mass of the polyamide resin (A), from 40 to 10 parts by mass of the polyamide resin (B) is contained.

14. The stretched film according to claim 1, wherein the stretched film has a modulus of tensile elasticity of 3.50 GPa or less, as measured in accordance with JIS K 7127.

15. The method according to claim 7, wherein the stretched film has a modulus of tensile elasticity of 3.50 GPa or less, as measured in accordance with JIS K 7127.

* * * * *